United States Patent
Glav

[15] 3,683,591
[45] Aug. 15, 1972

[54] PROCESS OF DRYING AIR AND APPARATUS INTENDED THEREFOR

[72] Inventor: Ola Glav, Vallentuna, Sweden

[73] Assignee: Carl Georg Munters, Stocksund, Sweden

[22] Filed: July 6, 1970

[21] Appl. No.: 52,184

[30] Foreign Application Priority Data

July 17, 1969 Sweden .................. 10113/69

[52] U.S. Cl. .......................... 55/34, 55/61, 55/390
[51] Int. Cl. ........................................... B01d 53/06
[58] Field of Search.......... 55/33, 34, 32, 61, 62, 208, 55/390

[56] References Cited

UNITED STATES PATENTS

| | | | |
|---|---|---|---|
| 3,528,224 | 9/1970 | Warn | 55/208 |
| 3,446,031 | 5/1969 | Chi et al. | 55/34 |
| 3,251,402 | 5/1966 | Glav | 55/34 |
| 2,687,783 | 8/1954 | Watkins | 55/61 |
| 2,993,563 | 7/1961 | Munters et al. | 55/34 |
| 3,498,026 | 3/1970 | Messinger et al. | 55/390 |

Primary Examiner—Charles N. Hart
Attorney—Sol B. Wiczer

[57] ABSTRACT

In a process of conditioning air in a multi-channel system comprising a first group of channels passed by a cooling agent and a second group of channels disposed alternately therebetween and passed by the air to be conditioned and having its walls coated with a sorbing agent, the cooling agent removing the heat set free by absorption of moisture from the air to be conditioned by heat convection through the walls between the groups of channels, the cooling is to an essential degree effected by evaporation of water into the cooling agent passing through the channels of the first group of channels. Preferably, the process includes also a particular mode of regeneration of the sorbing agent by a heating fluid supplied intermittently to the channels of the first group and accumulated by the walls of said channels covered with a wettable or water absorbent material. The apparatus for carrying out a process of air conditioning according to the invention comprises an exchanger body housed in a casing and formed with two groups of channels, the channels of one group being positioning alternating with the channels of the second group, the channels of the first group being adapted to be passed by a cooling agent admitted through an inlet and discharged through an outlet in the casing, and the channels of the second group being adapted to be passed by the air to be conditioned admitted through an inlet and discharged through an outlet in the casing. The walls of the channels to be passed by the air to be conditioned are provided with a coating of a hygroscopic substance acting as a sorbing agent, whereas the walls of the channels for the cooling agent by a coating of a sorbing agent are made adapted to be wetted taking up water which is evaporated into the cooling agent when it passes through said channels. Pregerably, all or part of the water is supplied intermittently as a heating agent for regeneration of the sorbing agent.

25 Claims, 11 Drawing Figures

PROCESS OF DRYING AIR AND APPARATUS INTENDED THEREFOR

BACKGROUND OF THE INVENTION

The present invention relates to a method of drying air in a multi-channel system having a first group of channels through which are passed a cooling agent, and a second group of channels alternately disposed between said channels and through which is passed the air to be conditioned and dried, the walls of the channels constituting carriers for a sorbing agent or sorber. The cooling agent by heat conduction or convection through the walls of the channel removes heat set free by the absorption of moisture from the air to be conditioned. The cooling agent thus has for its purpose the removal of condensation heat produced by the moisture of the air to be conditioned being taken up by the sorber or drying agent, whereby the air to be conditioned can be dried to predetermined absolute humidity without necessitating the relative humidity of the air at the same time to be lowered to extremely low values.

THE PRIOR ART

It has been suggested to use as cooling agent air such as atmospheric air which can take up a quantity of heat with corresponding increase of temperature. Over this prior art the invention is substantially characterized by the feature that the cooling to an essential degree is effected by evaporation of water into the cooling agent within the channels of said first group. In prior art practice the drying agent must be regenerated at certain intervals by removal of the absorbed water by means of a heating agent. According to another important feature of the invention the walls of the channels of the first group are caused to accumulate water, which is intermittently supplied by the heating fluid flowing through said channels.

By thus effecting the removal of heat from the hygroscopic drying agent according to the invention essentially by evaporation of water from the walls of the channels of the first group, the cooling capacity of the conditioning apparatus becomes considerably greater than when only the own sensible heat content of the cooling air would be made use of. According to the invention many advantages are obtained, because due to the substantially increased cooling capacity of the cooling air per unit of volume the quantity of cooling air can be reduced and the channels can be made minor for one and the same effect, which in an advantageous manner influences the economy of operation. In addition, the evaporation of water into the cooling air results in that lower temperatures are attained and thereby a deeper drying of the air to be conditioned is obtained. The quantity of heat which is removed from the air to be conditioned, according to the invention, can even be so great that the temperature of the conditioned air will be lower after the drying than before said drying.

According to still a valuable property of the invention the heat transfer between the two groups of channels is solely effected by convection in the wall material which for this purpose is essentially impermeable to both vapor and sorbing agent.

THE DRAWINGS

Further objects and advantages of the invention will become apparent from the following description, considered in connection with the accompanying drawings, which form part of this specification, and of which:

In the various embodiments of the invention the same or equivalent parts have in many cases been given the same reference numerals.

DETAILED DESCRIPTION OF APPARATUS ACCORDING TO THE INVENTION

Figure 1:
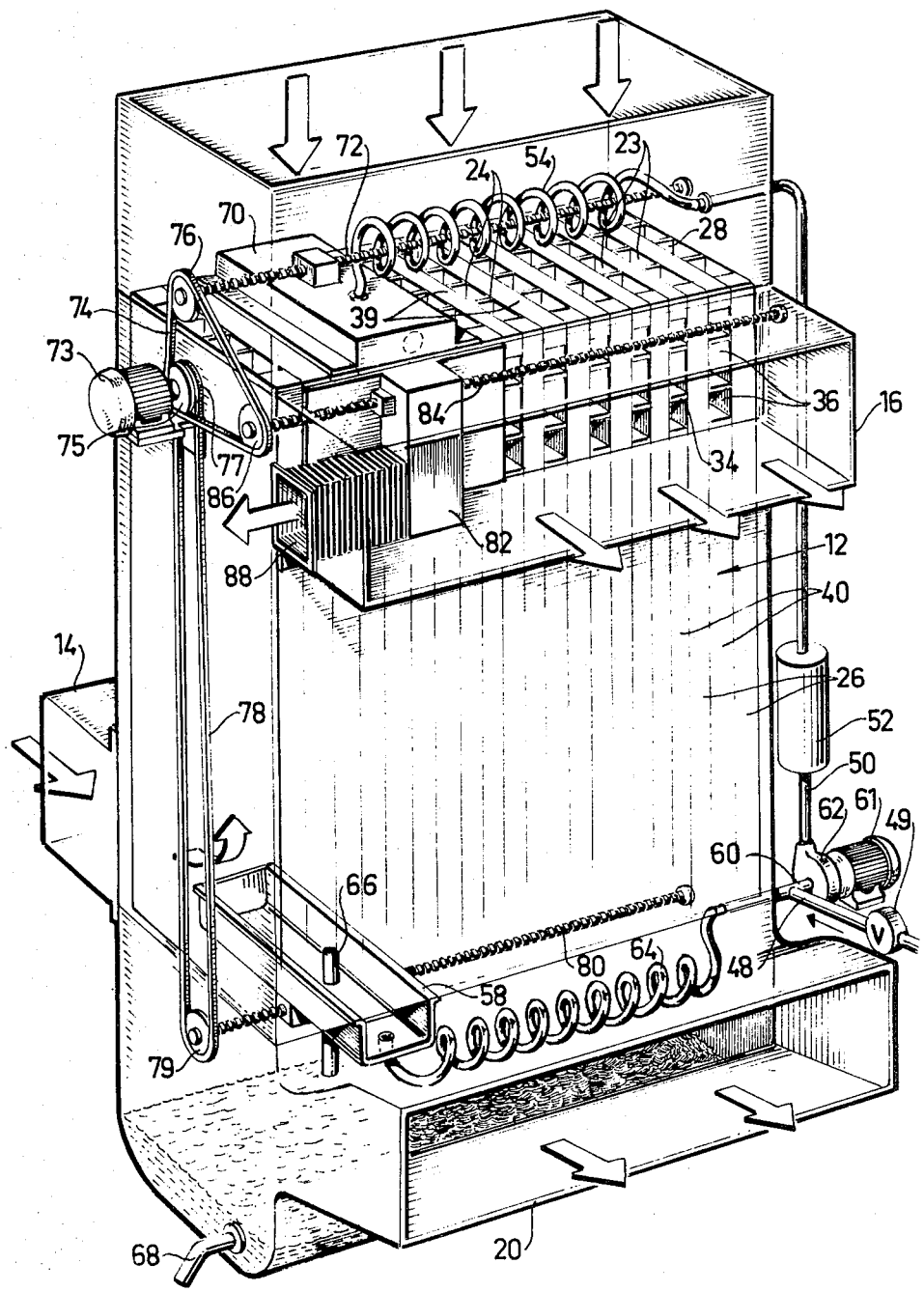
FIG. 1 is a perspective view of a drying apparatus constructed for carrying out the process of the invention.
Figure 5:
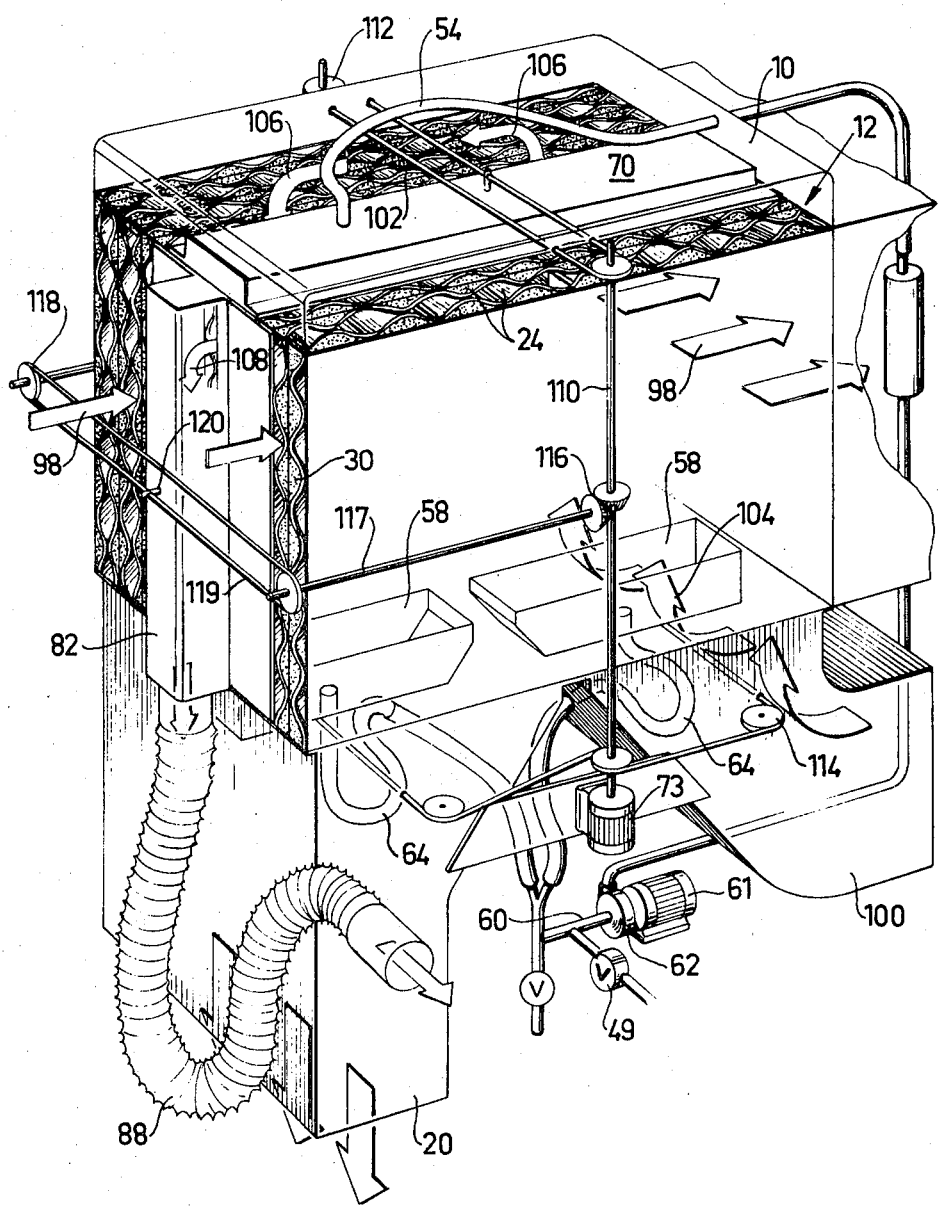
FIG. 5 is a perspective view of another embodiment for carrying out the process of the invention.
Figure 10:
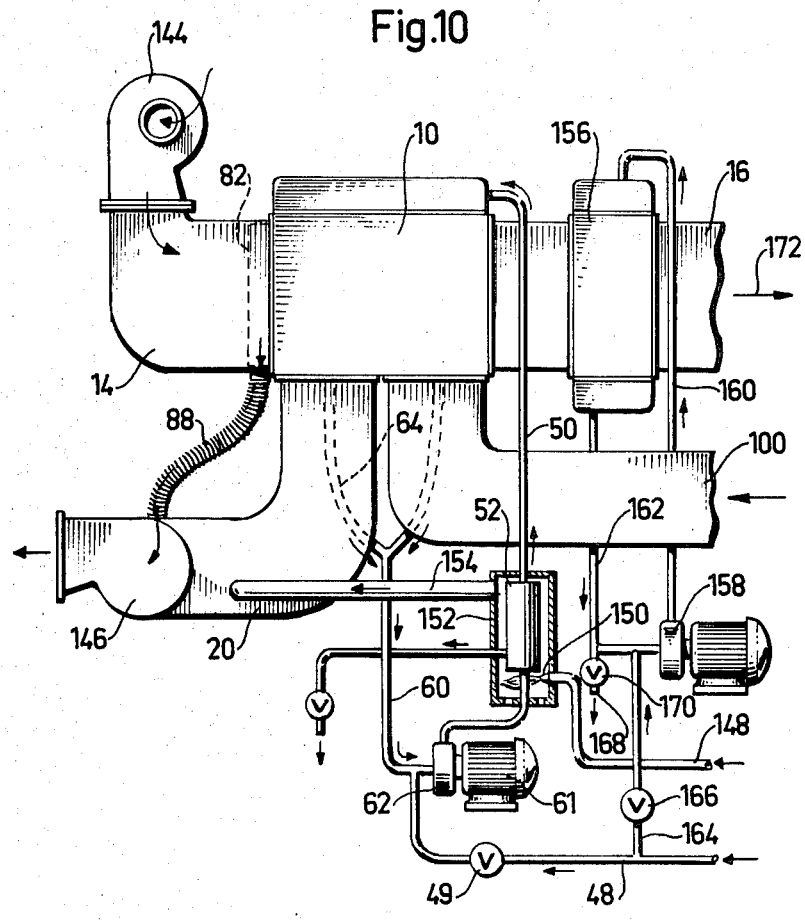
FIG. 10 shows a conditioning plant comprising a drying apparatus of the type shown in FIG. 5.

Referring now to the drawings and in particular the embodiment illustrated in FIGS. 1, 5 and 10 reference numeral 10 denotes a casing which houses an exchanger body 12 formed with channel systems. Said exchanger body is formed to be operated according to the counter-current principle with respect to the two fluids passing through said body. The air to be dried, thus the air to be conditioned, is introduced through a tube socket 14 mounted on the rear side of the casing 10 according to FIG. 1 adjacent the lower portion of the exchanger body 12. The dried and conditioned air escapes through a tube socket 16 at the opposite side of the apparatus and at the upper part thereof. Cooling air which may be constituted by consumed conditioned air is supplied to the apparatus at the top through an opening in the casing 10 and escapes into the outer atmosphere through a lateral socket 20 located at the lower part of said casing as shown in FIGS. 1 and 5.

Figure 2:
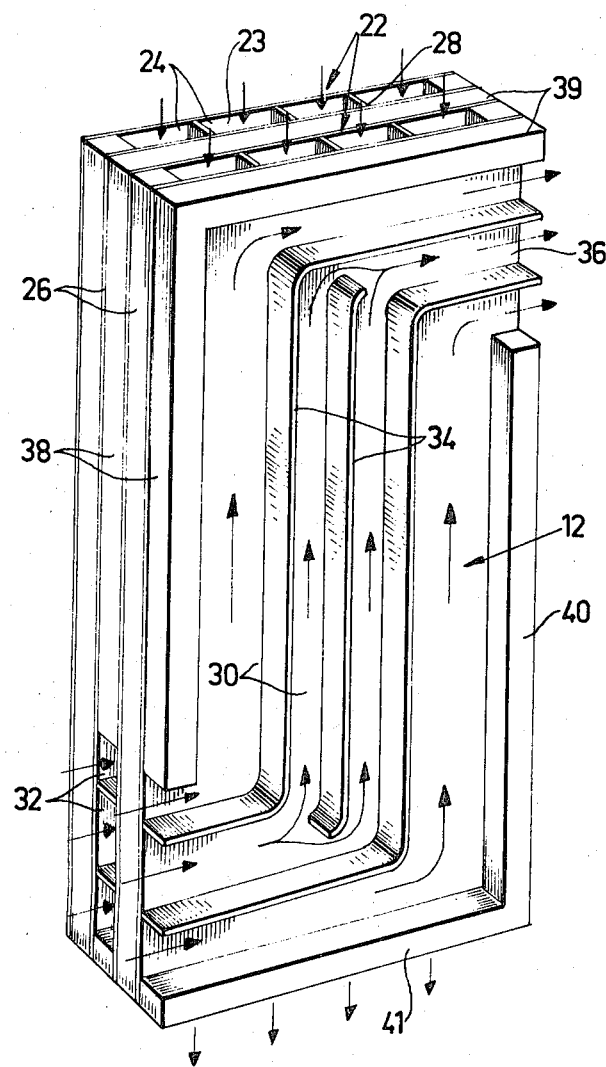
FIG. 2 is an illustration of the principal structure of the various groups of channels in the embodiment according to FIG. 1.

As is especially evident from FIG. 2, the body 12 is in the embodiment now in consideration subdivided by partitions generally denoted as 22, into two groups of interspaces or channels of which the one is passed by the cooling air and the other by the air to be conditioned. The interspaces 23 for the cooling air are open at the top and at the bottom but laterally closed by covering frame elements 26. Further the interspaces between the two parallel walls 22 are subdivided into branch channels 24 by means of partition walls 28. Alternating channels or interspaces for the air to be conditioned are positioned between the channels 23, said interspaces in the embodiment according to the FIGS.

1 – 4 also being subdivided into branch channels 30 which substantially have the form of a Z. Straight opposite the inlet socket 14 the channels 30 are formed with openings 32 directed towards said socket and are therefrom passed out over the entire breadth of the exchanger body 12 by means of partition walls 34. The channels then extend upwards towards outlets 36 located straight opposite the escape socket 16. The air to be conditioned streaming through the channels 30 is thus given along the major part of the walls 22 of the body 12 a vertical upwardly directed flow whereas it at the ends of the channels for shorter distances flows horizontally. The two air streams thus pass one another substantially in countercurrent. Except for the inlets 32 and the outlets 36 the channels 30 are closed by means of frame members as is indicated at 38, 39, 40, 41 in FIG. 2.

Figure 3:
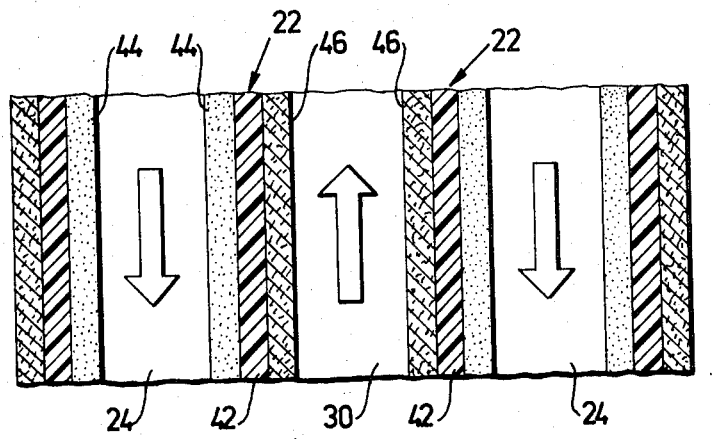
FIG. 3 is a diagrammatic illustration in a larger scale of portions of channels forming a part of the same embodiment.

The partition walls 22 are composed of three layers as in an exaggerated scale is shown in FIG. 3. Of these layers a thin intermediate layer 42 is of a material which is difficulty permeable or non-permeable to water in liquid or vapor state, which property is owned by certain plastic substances. This intermediate layer is coated on that side which faces the cooling air channels 24, with a layer 44 of a wettable or water absorbent or water retaining material, such as paper of cellulose or asbestos fibers. The channels 30 for the air to be conditioned located on the opposite side of the intermediate layer 42, have on their walls coatings of a hygroscopic or moisture absorbing substance, such as lithium chloride. Secured on the intermediate layers 42 can be carriers 46 of thin porous or fibrous material which is impregnated with the moisture absorbing substance.

Water is supplied to a circulation system in the apparatus from a pipe 48 suitably connected to a main and provided with a valve 49 (FIG. 1). This system comprises a riser 50 in which a heater 52 is provided and which at the top opens into a hose 54 which in turn is connected to one or several spraying devices 56 (FIG. 4) with bottom outlet holes above the channels 24. The supplied hot water flows downwards through these channels to be collected in a trough 58 between which and an inlet pipe to a pump 62 driven by a motor 61, a tube 64 is provided. The delivery side of the pump 62 is in connection with the riser 50. Through the circulation system described and the vertical channels 24 for the cooling air a circulation of water which is heated in the heater 62 up to almost the boiling point, is effected, as will be described in more detail in the following. Some supply of fresh water in addition to the quantity of water evaporating in the channels 24 can be brought about e.g. by forming the trough 58 with an overflow 66 through which water can flow down to the lower part of the apparatus which has a drain 68. In this manner the water circulating in the system is prevented from accumulating salts and the like ("minerals") in undesirable degree which could be deposited on the porous layers 44.

The spraying device 56 at its top and its sides is encased by a hood or cap 70 having lateral flanges 71 of such shape as to cover one inlet layer at a time so that cooling air is prevented from passing simultaneously with the heating agent or fluid, i.e. the hot water, through the channels 24 and to cool the channels 30 which are being regenerated at that moment. The hood 70 together with the spraying device 56 is actuated by a driving mechanism such as a screw 72 so as slowly to move in one direction over the upper surface of the exchanger body 12 whereby the individual rows of channels 24 in succession are sealed off from supply of cooling air and instead are contacted with the heating fluid. The screw 72 is rotated by a motor 73 and a W-belt 74 running about pulleys 75, 76, 86. From a pulley 77 on the shaft of the motor 73 a belt 78 extends downwards with its end entrained about a driving pulley 79 for a worm 80 which moves the trough 58 across the apparatus in horizontal direction synchronously with the hood 70. The hose connections 54 and 64 accomodate the axial motion of the hood 70 and the trough 58.

Provided in the outlet socket 16 for the conditioned air is a screen or shield 82 formed with lateral flanges 83 and which is similarly driven synchronously with the hood 70 by means of a worm 84 which is rotated by the pulley 86 driven by the belt transmission 74 from the motor 73. This screen has for its object to prevent that air which is present in the channels 30 in front of, and laterally adjacent the hood 70, from escaping through the tube socket 16 to the place of utilization of the conditioned air. The screen 82 thus follows the spraying device 56 during the horizontal motion thereof and is located in front of the openings 36 of the one or the two channels 30 adjacent that row of cooling air channels 24 which for the moment are heated by means of the hot water. The air which in this way is stopped by the screen 82 is discharged through bellows 88 into the ambient atmosphere. Other rows of channels for air to be conditioned are sealed off entirely, as explained below in more detail. The bellows can change their lengths in response to the position of the screen 82. The horizontal motion of the elements 70, 82 and 58 can be adjusted so after having passed over all rows of channels 24 and 36 they may return with greater speed to the opposite side of the exchanger body, during which motion the supply of hot water may be interrupted by means of members (not shown).

OPERATION OF THE DESCRIBED APPARATUS

The described apparatus is operated in the following manner. During operation the air to be conditioned is taken in through the tube socket 14 and flows upwards through the channels 30 to the outlet socket 16 and from there to the space the moisture content or humidity of which is to be controlled. During the passage through the channels 30 the air comes in contact with the sorption layer 46 so that moisture present in the air is absorbed by said layer. At the same time cooling air passes in downward direction through the channels 24 the wall layers 44 of which earlier have been wetted so that an evaporation into the cooling air is provoked. When moisture is absorbed in the channels 30 by the layers 46, the normal heat of condensation is released. This is conducted through the thin walls 42 to the released layers 44 in the channels 24. Since the layers 44 contain water heat can now be taken up by the cooling air due to the evaporation of the water in the channels 24. In this way an intensive convection of heat is obtained so that the temperature of the sorption agent and of the air to be conditioned and flowing within the channels 30 is maintained at a low value this in turn results in that the absorption of moisture becomes extremely good also when high relative moisture contents are in consideration. The quantity of cooling air which is required may be only a fraction of the quantity which would be required if only the inherent sensible heat content of the cooling air were utilized for the cooling. Hence the apparatus attains the advantages of relatively small dimensions and low costs of operation.

The sorbing agent must be regenerated at regular intervals by expelling the water taken up earlier. This regeneration is effected by means of the circulation system for hot water. Said hot water is supplied in sequence to the various rows of channels 24 for the cooling air, the layers 46 in the adjacent channels 30 for the air to be conditioned being heated simultaneously to so high a temperature that the moisture is removed from the drying agent. This moisture is then carried away by that branch stream of the air to be conditioned which escapes through the bellows 88 into the surrounding atmosphere and thus is not admixed to the conditioned air flowing to the place of consumption. The drying by means of hot water is rendered possible by the partition walls 42 difficulty permeable to moisture.

The coatings 44 in the cooling air channels 24 will be wetted when hot water is flushed therethrough and they will accumulate water which then is utilized during the drying of the air to be conditioned to remove heat by evaporation of water into the cooling air streaming through the channels 24.

Figure 4:
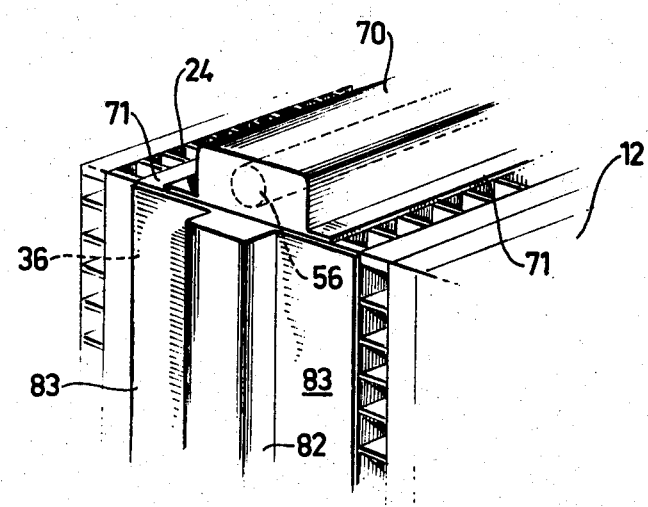
FIG. 4 is a perspective view of a portion of the exchanger body with associated co-operating members for regeneration of the sorbing agent.

As will be seen from FIG. 4, the screen 82 has an inner opening of a width corresponding to the width of two interspaces or channel rows in the exchanger body 12. The open width of the hood 70 is greater, such as, e.g. corresponding to four interspaces or channel rows. Therefore, hot water is always supplied simultaneously to two or three rows of channels 24 depending on the position of the hood during the advancement thereof. In the case with three channel rows the two outer ones are only partially open, but sufficiently to allow hot water to be flushed down into them. One row of channels 24 will thus always on one or both sides be adjacent to a row of channels 30 which is passed by regeneration air which escapes through the screen 82 to the outlet 88. At the same time each of the flanges 71 of the hood 70 ought to screen off at least one interspace width and each of the flanges 83 of the screen 82 at least three interspace widths. This is to prevent cooling air from passing through a row of channels 24 which is adjacent a row of channels 30 which on its opposite side is being heated by hot water flowing through the row of channels 24 located there. Further, no air to be conditioned is to be permitted to pass through a row of channels 30 which is adjacent a row of channels 24 the walls of which had not enough time to cool down after having been flushed with hot water.

The dimensions set forth above for the hood 70 and the screen 82 are to be regarded as minimum dimensions only. Thus, it is advantageous to supply heating fluid simultaneously to several and most suitably a greater plurality of rows of channels 24 by means of several spraying devices 56, a corresponding number of channels for conditioned air at the same time being subjected to regeneration. The regeneration will, however, in this case also be effected in a minor portion of the zone where drying of the air to be conditioned is in progress. Also the breadths of the flanges can be greater than one channel's width with respect to the flanges 71 and three channels' widths with respect to the flanges 83.

It is easily understood that in an apparatus according to FIG. 1 the number of rows of channels in which drying is being effected, in reality is much greater than the number of rows of channels which at one moment are located in front of the two elements 70 and 82.

STRUCTURE AND OPERATION OF APPARATUS WITH EXCHANGER BODY FOR CROSS-CURRENT OF FLUIDS

Figure 6:
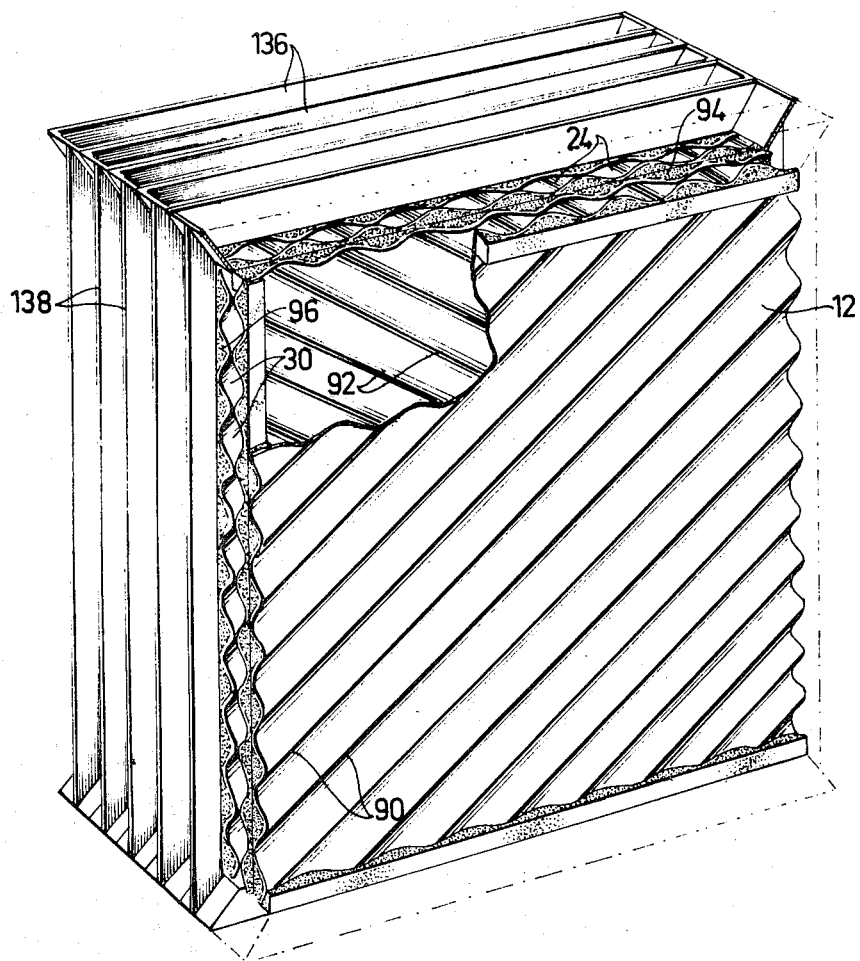
FIG. 6 is a perspective view of the exchanger body used in the embodiment according to FIG. 5.

In the embodiment according to the FIGS. 5 and 6 the exchanger body 12 is formed so that the two fluids pass through the same in cross-current.

All layers of the exchanger body 12 are corrugated, the corrugations 90 in each second layer forming an angle with the corrugations 92 in the intermediate layers. These angles are at the same time inclined relatively to the horizontal and the vertical planes. The interspaces between every second pair of layers are closed at the top and bottom by means of strings or strips 94 of some suitable tightening material. On both sides thereof open channels 24 are formed. However, pairs of layers positioned therebetween are closed along vertical edge strings or strips 96, so that channels 30 for the air to be conditioned are formed. Between the strings 94 and 96, respectively, the individual channels will extend over the surface of the exchanger body with a width varying from 0 at the places where the layers are in contact with one another, to the double height of the corrugations. The individual layers have the same composition as those described in connection with FIG. 3.

The air to be conditioned passes through the channels 30 of the body 12 in a horizontal main direction according to the arrows 98 towards the outlet socket 16. The cooling air is introduced through a tubular socket 100. The exchanger body 12 is provided with a vertical partition wall 102 which divides it into two halves. Therefore, the cooling air flows upwards from the inlet socket 100 in the right-hand half according to FIG. 5 as is indicated by the arrows 104. Between the upper edge of the exchanger body and the roof of the casing 10 there is an interspace into which the cooling air flows over to the left-hand half of the exchanger body whereunder it is deflected as indicated by the arrows 106, and then flows downwards to the outlet 20. The cooling air thus passes twice through the exchanger body 12 under repeated cross-current flow relative the horizontal direction of the air to be conditioned.

In the same manner as in the preceding embodiment a hood 70 within which at least one spraying device 56 is provided, is conveyed to and fro at the upperside of the exchanger body for intermittent supply of heat fluid in the form of hot water to the cooling air channels 24. At the bottom two troughs 58 are provided for receiving heating fluid from one and the other half of the exchanger body. These troughs are connected at their bottoms to flexible hoses 64 for conveying of the heating fluid impelled by the pump 62 back to the heater 52 and the top face of the exchanger body.

In this case the screen 82 has an extension corresponding to the entire height of the exchanger body 12 so that the channels 30 which are undergoing regeneration of the sorbing agent are entirely sealed off and the moist and consumed regenerating air instead escapes through a flexible hose 88 into the surrounding atmosphere. In this case the screen 82 is located at the inlet side for the air to be conditioned which thus in the regeneration zone passes in a direction opposite to that in the other channels 30 as is indicated by the arrow 108. The hood 70 and the screen 82 have been illustrated diagrammatically and thus should in reality have the same structure as described above in connection with FIG. 4.

The elements 70, 58 and 82 perform synchronized movements in the same manner as in the preceding embodiment, for which purpose they may be driven from the common motor 73, the shaft 110 of which drives a transmission 112 for the hood 70 and a transmission 114 for the two collecting troughs 58. A shaft 117 driven by a pair of conical gears 116 transmits the movement of the shaft 110 to a transmission 118 for the screen 82. The said transmissions can be made with belts 119 one side of which is connected with a pin 120 provided on one of the elements, e.g. the screen 82.

Laterally of the exchanger body there may be provided straight guide member 136 or the like (FIG. 6) in correspondence to the various rows of channels 24. Similar straight guide members 138 are provided along one side in correspondence to the various rows of channels 30. These guide elements have for their purpose to constitute supports and tightening means for the hood 70 and the screen 82, respectively, during the movements thereof.

OTHER EMBODIMENTS OF THE EXCHANGER BODY

Figure 7:
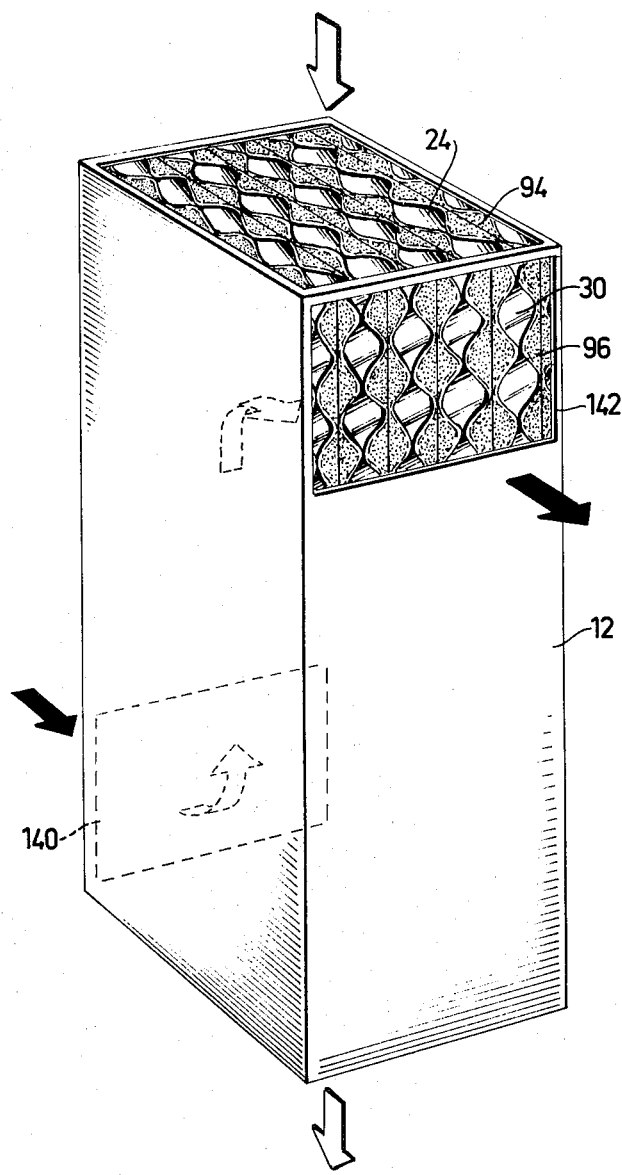
FIGS. 7 to 9 are perspective views of three various embodiments of an exchanger body formed with channel systems.

The embodiment illustrated in FIG. 7 has in the same manner as the preceding embodiment an exchanger body composed of corrugated layers the corrugations of which cross one another in adjacent layers. At the top and the bottom of the body strings or strips 94 are arranged and along the vertical sides strings or strips 96 for division of the contact body into two groups of channels 24 and 30, respectively. The exchanger body is provided with a casing which encloses the vertical sides thereof and has an opening 140 near the bottom of one side and an opening 142 near the top at the opposite side for passage of the air to be conditioned through the channels 30.

Figure 8:
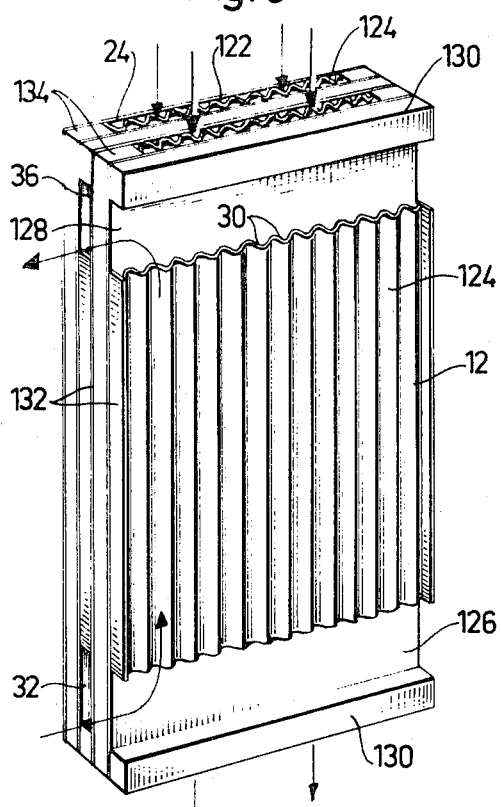

In the embodiment according to FIG. 8 the two groups of channels have been brought about by means of alternating plane layers 122 and corrugated layers 124 the corrugations of the latter ones extending vertically so that the exchanger body is operative according to the counter-current principle. The cooling air flows through the vertical channels 24 formed by each second corrugated layer and the plane layers adjacent the same from the top face or upper side of the exchanger body vertically downwards. The air to be conditioned is admitted through lower lateral openings 32 to a distribution interspace 126 and upwards through the channels 30 to an upper interspace 128 opening towards lateral outlets 36. In order to cover the edges where no flow has to take place, frame elements 130 are disposed at the top and the bottom and vertical frame elements 132 along the channels 30 for the air to be conditioned. The channels 24 for the cooling air are laterally covered by frame elements 134. The corrugated layers 124 need not be diffusion-tight as they on both sides are in contact with one and the same fluid. Instead, they may have an intermediate portion of thin metal sheet which has high heat conductivity. This intermediate portion is on both sides provided with a coating of sorbing agent facing the channels for the air to be conditioned and with a water absorbing lining facing the channels for the cooling air in the same manner as described above.

Figure 9:
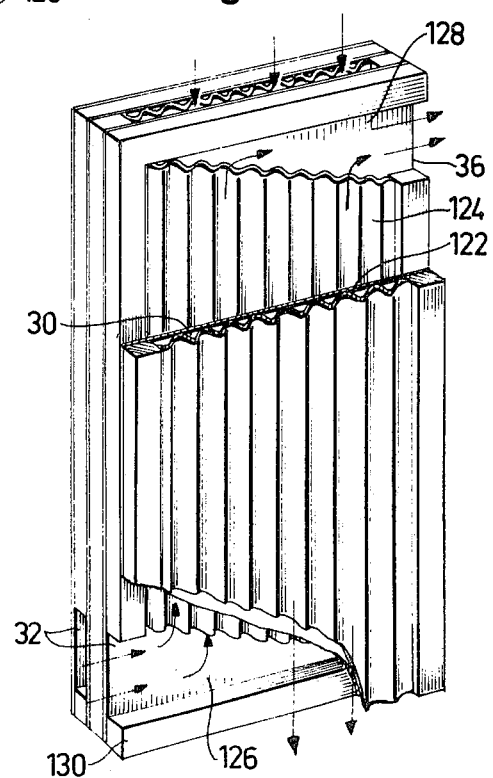

The embodiment illustrated in FIG. 9 differs from the preceding ones mainly in that the upper interspace 126 and the lower interspace 128 have decreasing height in a direction from the inlet openings 32 and the outlet openings 36, respectively, by the layers 124 being cut off obliquely in a corresponding manner.

DESCRIPTION OF CONDITIONING PLANT

The plant shown in FIG. 10 has a moisture exchanger 10 which generally is of the structure shown in FIG. 5. Atmospheric air is sucked in through a fan 144 to the tubular socket 14 and flows thereafter in substantially horizontal direction through the channels 30 of the exchanger body to an outlet socket 16. The cooling air is constituted by consumed room air which streams through the channel 100, the channels 24 of the exchanger body and the outlet 20 to the suction side of a fan 146 which leads the cooling air off to the atmosphere. In this embodiment the heater 52 is gas-fired and has a gas supply conduit 148 with a burner 150 mounted within an outer casing 152. The products of combustion escape through a conduit 154 to the outlet 20.

Provided in the outlet socket 16 for the dried and conditioned air is a moistener 156 e.g. of the kind disclosed in the U.S. Pat. No. 3,262,682 and the U.K. Pat. No. 1,055,796. Water is caused to circulate intermittently through the moistener 156 by means of a pump 158, a supply pipe 160 and a return pipe 162 which is connected to the suction side of the pump 158. Water is supplied to the moistener from the main pipe 148 (159) through a branch pipe 164 controlled by a valve 166. To prevent the content of salts and the like in the circulating water to reach unsuitable high values, the water content is renewed at regular intervals through a drain pipe 168 controllable by a valve !79.

The moistened and thereby additionally cooled air flows into the room to be conditioned according to the arrow 172.

EXPLANATION OF INVENTIVE PROGRESS BY PSYCHOMETRIC GRAPH

Figure 11:
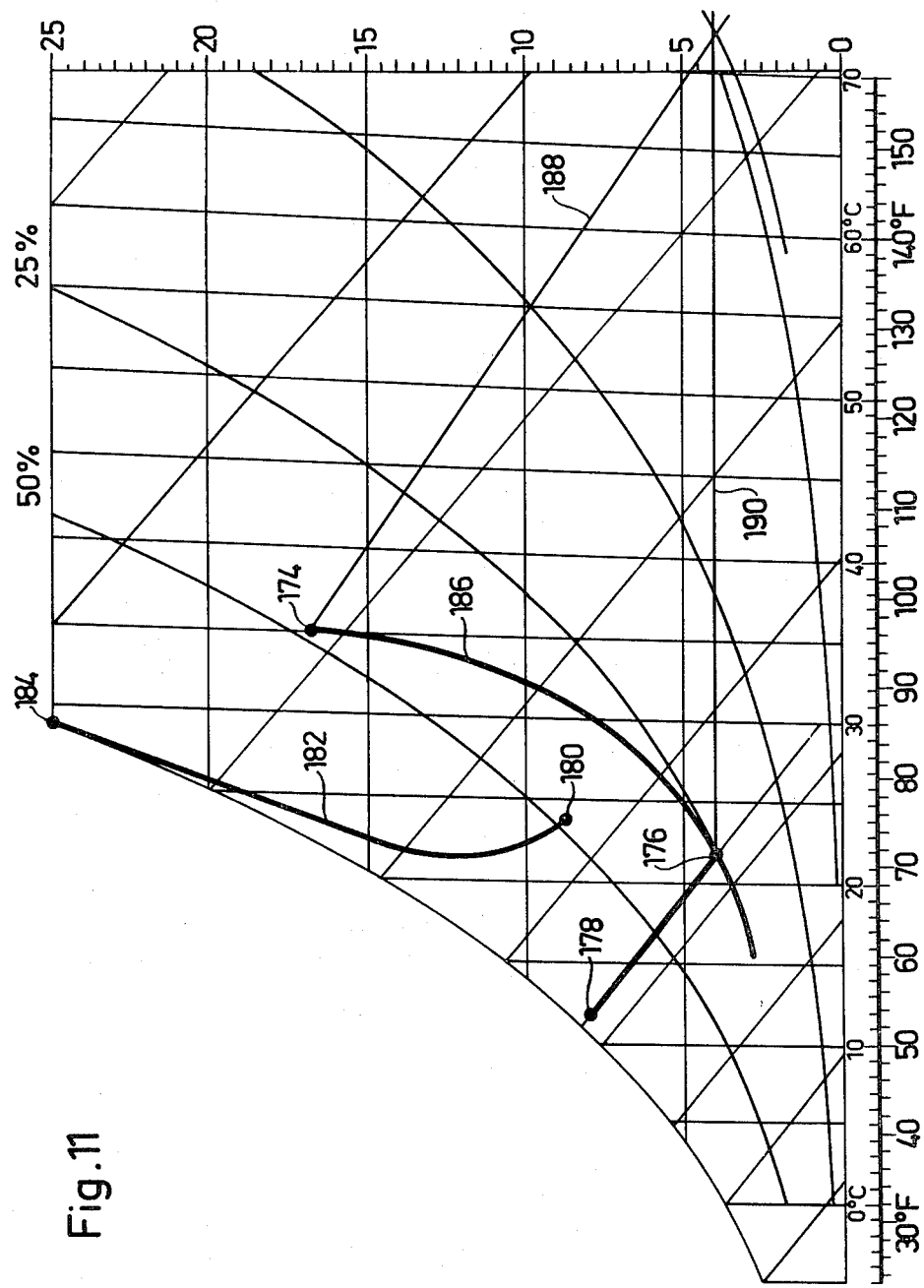
FIG. 11 is a graph.

In the psychometric graph shown in FIG. 11 the ordinate represents the absolute water vapor content of the air in e.g. grams per kilogram air and the abscissa thereof the temperature of the air. In addition the graph represent various relative moisture contents of the air. The air to be conditioned is introduced through the fan 144 and has the state according to point 174 which may be a relative moisture content of about 45 percent and a temperature of 35° C. In the moisture exchanger 10 this air is dried to the state 176 which e.g.

is a relative moisture content of 25 percent and a temperature of 22° in which state the conditioned air is introduced into the room. The difference between the distance of these points from the abscissa represents the quantity of water removed from the air. In the moisture exchanger 156 a moistening of the air to the state 178 is effected which corresponds to a relative moisture content of 90 – 95° and a temperature of 12° C in which state the conditioned air is introduced into the room.

From the room the air is withdrawn in the condition 180 which may be a relative moisture content of 50 percent and a temperature of 23° C. When this air is utilized for the cooling in the drying apparatus 10 it is subjected to a change of state approximately according to the graph 182 i.e. it takes up great quantities of moisture by evaporation of the water absorbed by the water-absorbing layers 44 and reaches finally a state approximately according to the point 184 which may correspond to saturated air.

Between the points 174 and 176 the air to be conditioned is subjected to a change of state according to the graph 186, i.e. the moisture content is reduced and at the same time also the temperature due to the presence of water in the channels 24. If, to the contrary, the drying of the air to be conditioned had been effected without the simultaneous cooling of the air, the change of the condition of this air would have followed the graph 188 in FIG. 11, i.e. it had required drying down to relative moisture content of below 2 percent under simultaneous rise of temperature above 70° C to reach the same low absolute moisture content as is present at the point 176. In order then to arrive at the state according to this point a particular cooling must be performed according to the line 190 extending in parallel to the abscissa.

According to an other embodiment of the invention the heating fluid for the regeneration may be constituted by steam which may have a temperature of 100° C or even more. In the regeneration process a condensation of steam occurs the condensate then being sucked up by the porous layers 44. In some cases water may be supplied to the layers 44 laterally adjacent the zone which at a certain moment is subjected to regeneration and in which air heated in advance may be supplied to the channels 30 for the air to be conditioned in usual manner for expelling the moisture taken up by the drying fluid. The adjacent channels are then sealed off so that no flow of cooling air comes into existence within the same.

While one more or less specific embodiment of the invention has been shown and described, it is to be understood that this is for purpose of illustration only, and that the invention is not to be limited thereby, but its scope is to be determined by the appended claims:

what is claimed is:

1. Process of drying air comprising passing the air to be conditioned over a heat conductive impermeable partition having a surface coated with a desiccant, the opposite side of said partition having a porous surface, maintaining said opposite porous surface wet with water, and simultaneously passing another air stream substantially at atmospheric pressures over said water-wet surface, whereby both surfaces are evaporatively cooled by evaporation of the water from said opposite surface while the air passed over the said first surface is both dried and evaporatively cooled in flowing heat conductive and drying contact with said desiccant.

2. The method as defined in claim 1 wherein only isolated portions of said opposite surface are progressively wet with a member of the group consisting of hot water and the steam supplied under heat exchange conditions to condense at least a portion sufficient to wet said surface portion, heating an opposite isolated portion of said first surface coated with desiccant to regenerate said desiccant.

3. The method of claim 2 wherein the isolated portions of said surface being treated have the evolved water and moisture disposed of simultaneously and independently of the said evaporative and conditioning air streams.

4. Process of drying air as defined in claim 1 wherein said desiccant coated surface is arranged in a first group of channels through which the air to be conditioned is passed, the interior surfaces of said channel corresponding to said desiccant coated surface and said opposite porous side of said desiccant coated surface being divided into a second group of channels alternately arranged in heat conductive contact with respect to said first group of channels, said other air stream being passed over the water-wet surfaces of the opposite porous surfaced channels to effect cooling of the desiccant and air simultaneously being dried in passage through said first group of channels.

5. The method as defined in claim 4 wherein the desiccant on the surfaces in heat conductive contact of the channels is regenerated in a series, one channel at a time, by wetting and heating an opposite surface with a member of the group consisting of hot water and steam, the steam being under heat exchange conditions to condense at least a portion, thereby heating both opposite surface portions to regenerate said desiccant coating, and then cooling the said wetted opposite surface of a channel member for subsequent evaporative cooling by passage of said other air stream through said channels.

6. The process as claimed in claim 5 wherein the water is supplied to the first group of channels in liquid state.

7. The process as claimed in claim 5 wherein in that the water is supplied to the first group of channels in vapor state.

8. The process as claimed in claim 5 wherein the supply of heating fluid is effected in succession to the individual channels for the cooling agent, the supply of evaporative air at the same time being interrupted to at least that of the channels which at any definite moment receive heating fluid.

9. The method as claimed in claim 8 wherein the supply of heat is also interrupted to at least the channel for the cooling agent situated nearest outside adjacent said channel receiving heating fluid.

10. The process as claimed in claim 8, wherein the air to be conditioned passing through a channel in the said second group adjacent a channel in the first-mentioned group which at the definite moment is supplied with heating fluid, is withdrawn to an outlet.

11. The process as claimed in claim 10, wherein a channel for the air to be conditioned which is adjacent a channel for the cooling air, recently passed by heating fluid and still warm, is wholly sealed off.

12. The process as claimed in claim 5, wherein water is caused in a closed circuit to pass through a heating device, at least one channel for the cooling agent in a regeneration zone movable above the exchanger body, and a collecting trough located at the lower portion of said body.

13. An apparatus for drying air in a multi-channel system comprising an exchanger body having heat conductive impermeable partition walls subdividing said body into two groups of channels, every second channel being connect to at least one inlet and at least one outlet for air to be conditioned and every second intermediate channel being connected to at least one inlet and at least one outlet for a cooling agent, the channels for the air to be conditioned having a coating of a desiccant agent, the opposite channel walls having surfaces only sufficiently porous to retain water thereon, means for wetting said channel surfaces with water and means for passing an air stream through said water-wet channels to cool said water-wet walls by evaporation of the water together with the desiccant by heat exchange coated upon the opposite wall surfaces of the alternate channels.

14. The apparatus as claimed in claim 13, wherein the source of water is adapted to deliver the water in liquid state.

15. The apparatus as claimed in claim 13, wherein the source of water is adapted to deliver the water in vapor state.

16. The apparatus as claimed in claim 13, wherein the channels in the exchanger body for the cooling agent are disposed to cooperate with members for intermittent supply of water to the individual cooling agent channels.

17. The apparatus as claimed in claim 16, wherein said members include a spraying device surrounded by a hood and disposed over one side of the exchanger body and located displaceably along said side.

18. The apparatus as claimed in claim 17, wherein the spraying devise with the surrounding hood is disposed over and displaceable along the upper side of the exchanger body.

19. The apparatus as claimed in claim 17, wherein in a conduit leading to the spraying device is provided a heater element by means of which the heating agent is heated to be utilized thereupon for indirect heating of the sorbing agent in the outer group of channels and regeneration of said agent.

20. The apparatus as claimed in claim 17, wherein in addition to the hood a screen is provided in the path of the air to be conditioned in the passage leading from said second group of channels in the exchanger body, said screen being movable synchronously with the hood and the spraying device and adapted to deflect air moistened during the regeneration to a separate outlet.

21. The apparatus as claimed in claim 20, wherein the screen has such shape that it completely seals off the passage through those channels for the air to be conditioned which are located adjacent that those channels from which regeneration air is withdrawn to said outlet.

22. The apparatus as claimed in claim 17, wherein the hood is shaped to completely seal off adjacent channels for cooling agent which are adjacent immediately those channels for air to be conditioned which at their opposite side are heated by the heating fluid.

23. The apparatus as claimed in claim 13, wherein the partition walls of the exchanger body are formed with a lining substantially impermeable to water in liquid state or steam state.

24. The apparatus as claimed in claim 23, wherein both sides of said lining are porous layers serving as carried for the desiccant agent or as accumulators for the supplied water.

25. The apparatus as claimed in claim 19, wherein a trough is mounted below the exchanger body for collecting excess water which is returned by a pump to the heating element and the upper side of the exchanger body.

* * * * *